(12) United States Patent
Keip

(10) Patent No.: US 7,337,811 B1
(45) Date of Patent: Mar. 4, 2008

(54) PRESSURIZED HYDROGEN STORAGE SYSTEM

(76) Inventor: Charles P. Keip, 1052 Byron Rd., Byron Center, MI (US) 49315

( * ) Notice: Subject to any disclaimer, the term of this patent is extended or adjusted under 35 U.S.C. 154(b) by 208 days.

(21) Appl. No.: 11/280,647

(22) Filed: Nov. 17, 2005

Related U.S. Application Data

(63) Continuation of application No. 10/995,834, filed on Nov. 23, 2004.

(51) Int. Cl.
*B65B 31/00* (2006.01)

(52) U.S. Cl. .................. 141/4; 141/2; 141/10; 141/114; 220/495.05; 62/45.1

(58) Field of Classification Search .............. 141/2, 141/4, 10, 100, 114; 220/581, 586, 495.01, 220/495.05; 62/45.1
See application file for complete search history.

(56) References Cited

U.S. PATENT DOCUMENTS

| | | | |
|---|---|---|---|
| 3,919,855 A | 11/1975 | Turner | |
| 3,924,773 A | 12/1975 | Wilkinson | |
| 4,154,364 A | 5/1979 | Hagiwara et al. | |
| 4,461,398 A | 7/1984 | Argy | |
| 5,085,343 A * | 2/1992 | Scarr ..................... | 220/560.1 |
| 6,347,719 B1 | 2/2002 | Rosen et al. | |
| 6,371,323 B1 | 4/2002 | Fernandes | |

* cited by examiner

*Primary Examiner*—Timothy L. Maust
(74) *Attorney, Agent, or Firm*—Harpman & Harpman

(57) ABSTRACT

An apparatus and method for storing gases and liquids having a high trans-migration rate through containment surfaces due to their molecular size. An inner pressurized retaining enclosure for the storage of gas and liquids has a second enclosure wall about the first enclosure defining a gap between the respective enclosure surfaces which is filled with a containment gas or liquid having a molecular size greater than the porosity of the storage wall and stored gas or liquid. The containment gas effectively impedes the transmission of the storage gas and liquid through the first inner pressure retainer enclosure by creating a pressure barrier on its outer surface.

7 Claims, 1 Drawing Sheet

PRESSURIZED HYDROGEN STORAGE SYSTEM

This is a continuation of patent application Ser. No. 10/995,834, filed Nov. 23, 2004.

BACKGROUND OF THE INVENTION

1. Field of the Invention

This invention relates to efficient storage of pressurized gases and liquids having high natural trans-migration rate which makes them difficult to store over time without a calculable loss rate through the storage enclosure. Hydrogen gas storage therefore is difficult thus limiting its commercial use as a portable energy source.

2. Description of Prior Art

Prior art storage of hydrogen gas or in a liquid form has required relatively large volume storage tanks which by their very nature, composition and size are very heavy and therefore preclude their expanded use into useful energy using venues such as automobiles and other modes of transportation and stationary energy sources. The low temperature of liquid hydrogen requires substantial insulation and specialized transfer equipment all of sufficient strength and thickness to withstand the internal pressure and cold associated therewith. Such attempts to solve these storage problems can be seen, for example, in U.S. Pat. No. 6,347,719 directed to a lightweight liquid hydrogen storage tank utilizing dual wall storage vessel which is segmented into multiple radial chambers. Each of the chambers is evacuated to a high vacuum which along with the composition of the outer shell a complicated sandwich having a low conductive nature is required.

U.S. Pat. No. 4,461,398 is directed to a storage tank for liquefied hydrogen gas which defines a multi-wall enclosure with thermal insulation between the walls.

U.S. Pat. No. 4,154,364 discloses thermally insulating containers for liquid gases having a double wall storage container. The gap between the walls is evacuated to a high vacuum and a gas absorbing material is provided in the vacuum.

U.S. Pat. No. 6,371,323 claims a double walled poly-steel storage tank having an outer steel wall tank and an inner tank of thermoplastic material with the tanks bonded together by multiple accessory fittings. The space between the tanks have leak detection equipment associated therewith for monitoring the internal tank leakage should it occur.

In U.S. Pat. No. 3,924,773, a fuel tank is shown in which a double fuel tank is claimed having an inlet and a pressure relief valve in communication with the area between the tanks which acts as a safety layer which upon rupture dispenses carbon dioxide gas to suffocate fuel fires should the inner tank rupture.

A cryogenic storage tank is shown in U.S. Pat. No. 3,919,855 having a dual skinned enclosure wall whose cavity therebetween is packed with insulating material.

All of the above cited prior art is directed to either liquid hydrogen storage or fossil fuel tank configurations which do not address the rigorous storage and transportation requirements of hydrogen gas under high pressure. In such configurations the high vacuum between the walls would simply increase the trans-migration of hydrogen gas. Only applicant's storage system utilizes the inherent trans-migration of hydrogen through the contact wall to affect a seal thereagainst by the inert gas under positive pressure.

SUMMARY OF THE INVENTION

A storage vessel and method of retaining pressurized gases and liquids having inter-material transmission properties that affect a material loss corresponding to material porosity and effective storage pressures. A method of using a multiple wall storage vessel wherein the inner retainment container of the pressurized material is surrounded by a chamber of inert containment gas or liquid under pressure having no effective transmission properties with the containment material used. The containment material efficiently seals the inner retainment container porosity in regard to the stored material under containment pressure within.

DETAILED DESCRIPTION OF THE INVENTION

Figure 1:
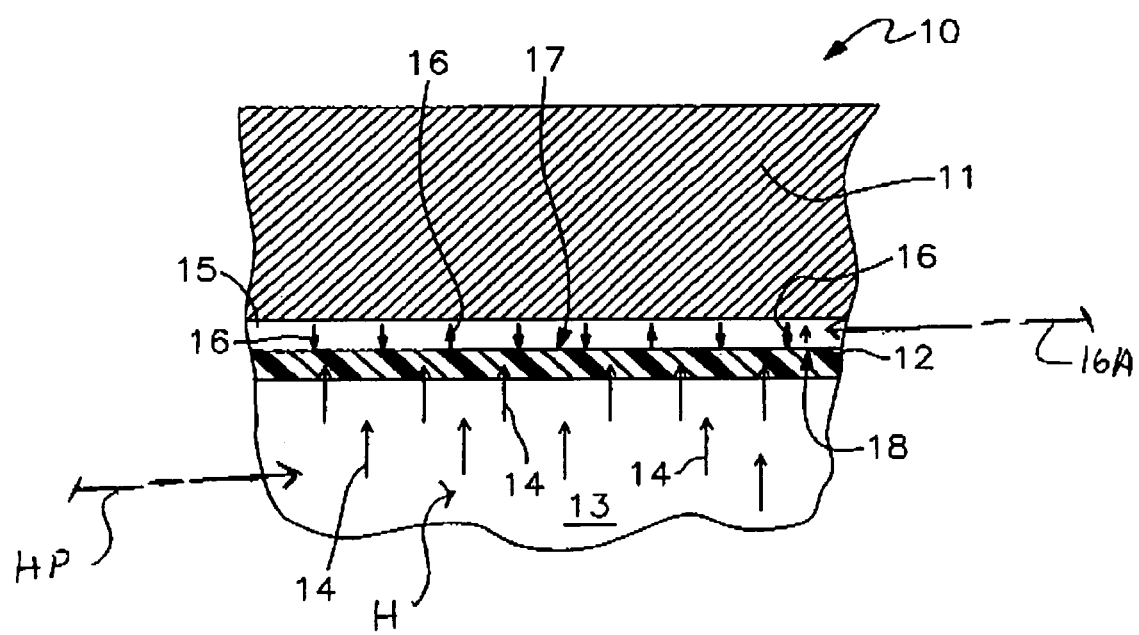
FIG. 1 is a graphical cross-section of the containment wall configuration with illustrating gas permeation representation.

Referring to FIG. 1 of the drawings, a graphic illustration of a method structure 10 of the invention can be seen in which the basic underlying structural orientation and inner dependency is evident. In this example, an outer containment wall 11 is formed of any suitable enclosure material having the properties to meet pressure containment criteria of the stored gas. Such containment wall material may be of a carbon fiber composite material which has a high strength to weight ratio for mobile applications, such as transportation vehicles.

An inner membrane 12 is formed within the defined enclosure and is used as the primary containment barrier of the storage system of the invention. The inner membrane 12 is formed within the outer enclosure wall and defines an inner storage chamber 13 therein. The inner membrane 12 may be made of any suitable storage material that is non-reactive to the storage gas under pressure which is, in this example, hydrogen H which is pressurized by a source of hydrogen pressure PH.

A sealing chamber 15 is formed between the outer containment wall 11 and the inner membrane 12 and is pressurized by a source of pressurization 16A to a value greater than that of the inner storage chamber's "hydrogen" gas pressure with an inert containment gas 16 such as argon which is non-reactive with hydrogen.

Hydrogen is difficult to store efficiently given the nature of hydrogen molecules illustrated by the directional arrows in FIG. 1 of the drawings which are among the smallest of all elements and therefore will penetrate and "bleed" through most containment vessels heretofore available. The effective rate of this trans-migration of the hydrogen molecules 14 through the inner membrane 12 is dependent on the porosity of the material used and the storage pressure under which the hydrogen is stored within the inner storage chamber 13.

A sealing chamber 15 is formed between the outer containment wall 11 and the inner membrane 12 and is pressurized to a value greater than that of the inner storage chamber's "hydrogen" gas pressure with an inert containment gas 16 such as argon which is non-reactive with hydrogen.

The containment gas 16 is of a molecular size greater than that of the hydrogen and the molecular porosity of the inner membrane 12's material forming a pressure seal against the outer surface 17 of the inner membrane 12.

It will be evident that a calculable initial loss of hydrogen gas will occur due to the saturation of the inner membrane 12 illustrated at 18 there within.

It is also noted that hydrogen gas is subject to the same laws of physics in which any time a gas under a positive pressure is manipulated by transcended conditions such as directional displacement in a conduit, there is an inherent loss of pressure. This affords a reduction of containment gas pressure required to maintain an effective molecular barrier against the stored hydrogen gas under relatively high pressure well defined within the industry.

It is important to note that the hydrogen and argon or other sealing gases will never reach equilibrium which is a natural phenomenon of gases at different pressures in contact with one another. It will also be evident from the above description that a pressure regulation mechanism will be required to regulate the pressure of the inert gas within the sealing chamber 15 to correspond to the lower pressure within the chamber 13 as the hydrogen is added or depleted which will be well known and understood by those skilled in the art.

An alternate storage vessel may be used under the storage method of the invention in which multiple vessels are configured one within another with both vessels being capable of the maximum storage pressure of the stored gas which would add to their size and weight when achieving higher pressure containment criteria which is undesirable in transportation applications, but is irrelevant for fixed storage applications as noted.

An alternate storage method of pressurized liquid requires the same multiple stage tank configuration as set forth hereinbefore in which a liquid under pressure to be stored is maintained by the surrounding sealing chamber having a corresponding liquid or gas under equal or greater pressure than that of the known storage liquid pressure thus maintaining the containment of the stored pressurized liquid.

It will thus be seen that a new and novel method and apparatus for storing hydrogen gas has been illustrated and described and it will be apparent to those skilled in the art that various changes and modification may be made therein without departing from the spirit of the invention.

Therefore I claim:

1. An apparatus for storing hydrogen gas under a known pressure comprising, a hydrogen permeable containment membrane defining a first enclosure, an outer containment wall surrounding said containment membrane defining a second enclosure, a sealing chamber formed between said containment membrane and said containment wall, means for pressurizing said sealing chamber with inert containment gas to a known pressure, and pressurizing said first enclosure with hydrogen gas to a pressure less than or equal that of said known pressure of said inert gas.

2. The method and apparatus set forth in claim 1 wherein said hydrogen permeable membrane is selected from a group of materials compatible with high pressure hydrogen storage.

3. The method and apparatus set forth in claim 1 wherein said outer containment wall surrounding said containment membrane is of a rigid self-supporting material non-porous to said inert containment gas.

4. The method and apparatus set forth in claim 1 wherein said hydrogen permeable membrane containment membrane is of a material having a known dimensional molecule porosity and said inert containment gas is of a molecular size greater than that of said known molecular porosity of said containment membrane material.

5. The method and apparatus for storing hydrogen gas set forth in claim 1 wherein said containment membrane is non-reactive to said hydrogen gas.

6. The method and apparatus set forth in claim 1 wherein said inert containment gas is of a known molecular size and said hydrogen gas is of a known molecular size less than that of said molecular size of inert gas.

7. A method and apparatus for storing a liquid under a known pressure comprises, a liquid permeable containment membrane defining a first storage enclosure, an outer containment wall surrounding said containment member defining a second enclosure, a sealing chamber formed between said containment members and said containment wall, filling said second enclosure with a containment fluid of a known composition to a known pressure, filling said first storage enclosure with a fluid under a pressure less that or equal that of said known pressure of said sealing chamber, an integral pressure drop within said first enclosure during transmigration with said containment member, stabilization of said pressure in said first storage enclosure and sealing said first storage enclosure by said pressurized containment fluid within said second enclosure.

\* \* \* \* \*